United States Patent
Allman et al.

(10) Patent No.: US 7,580,760 B2
(45) Date of Patent: Aug. 25, 2009

(54) SAMPLING MESSAGES FROM A DATA FEED

(75) Inventors: Mark Allman, Southampton (GB); John Anthony Davies, Winchester (GB); Gerald Reilly, Whitchurch (GB); Brian John Venn, Chandlers Ford (GB); Andrew Paul Waters, London (GB); Ewan Victor Withers, Bishops Waltham (GB)

(73) Assignee: International Business Machines Corporation, Armonk, NY (US)

( * ) Notice: Subject to any disclaimer, the term of this patent is extended or adjusted under 35 U.S.C. 154(b) by 494 days.

(21) Appl. No.: 11/377,512

(22) Filed: Mar. 16, 2006

(65) Prior Publication Data

US 2007/0219649 A1    Sep. 20, 2007

(51) Int. Cl.
*G06F 17/00* (2006.01)
*G06E 1/00* (2006.01)
*G06N 5/00* (2006.01)
*G06Q 40/00* (2006.01)
*G06F 12/00* (2006.01)

(52) U.S. Cl. .................. 700/73; 707/100; 707/101; 707/204; 706/21; 706/45; 705/35; 705/37

(58) Field of Classification Search .......... 707/100, 707/101, 204; 706/21, 45; 705/35, 37
See application file for complete search history.

(56) References Cited

U.S. PATENT DOCUMENTS

| | | | | |
|---|---|---|---|---|
| 4,745,559 A | * | 5/1988 | Willis et al. | 705/37 |
| 5,479,573 A | * | 12/1995 | Keeler et al. | 706/21 |
| 6,006,206 A | * | 12/1999 | Smith et al. | 705/35 |
| 2002/0049687 A1 | * | 4/2002 | Helsper et al. | 706/45 |
| 2005/0004927 A1 | * | 1/2005 | Singer | 707/100 |
| 2006/0200507 A1 | * | 9/2006 | Holenstein et al. | 707/204 |
| 2007/0214340 A1 | * | 9/2007 | Leveille et al. | 711/203 |

OTHER PUBLICATIONS

Pietzuch et al, "Congestion Control in a Reliable Scalable Message-Oriented Middleware".
Banavar et al, "Information Flow Based Event Distribution Middleware".
Banavar et al, "An Efficient Multicast Protocol for Content-Based Publish-Subscribe Systems".
Cilia et al, "Looking into the Past: Enhancing Mobile Publish/Subscribe Middleware".
CodeStreet ReplayService for TIBCO Randezvous/JMS, TiVo for Messaging.

* cited by examiner

*Primary Examiner*—Ronald D Hartman, Jr.
*Assistant Examiner*—Sunray R Chang
(74) *Attorney, Agent, or Firm*—Justin M. Dillon; Herman Rodriguez

(57) ABSTRACT

Disclosed is a method, apparatus and computer program for sampling a data feed of messages at regular time intervals. A current sample point is identified. A time interval is also identified which is defined by the current sample point and at least one of the previous sample point and the subsequent sample point. At least one message is selected to associate with the current sample point. The selection is made from the identified time interval. The selected message(s) is then associated with the current sample point.

8 Claims, 8 Drawing Sheets

US 7,580,760 B2

SAMPLING MESSAGES FROM A DATA FEED

FIELD OF INVENTION

The present invention relates to apparatus, methods and computer programs for sampling a data feed within a data communications network.

BACKGROUND

The invention is applicable to many data processing and communications systems, including publish/subscribe messaging systems in which subscribers can specify a subset of published messages that they wish to receive, and including publish/subscribe messaging systems in which transmitted messages are retained for retransmission or analysis.

Publish/subscribe communications involve information producers publishing information or events to a publish/subscribe system, and information consumers subscribing to particular categories of information or events and receiving relevant publications from the system. The publish/subscribe system may comprise a message broker, located between publisher and subscriber applications, which delivers published information or events to all interested subscribers.

The publish/subscribe communication paradigm supports many-to-many communications in which individual publishers and subscribers may be anonymous to each other (communicating via an intermediate broker) and can be easily added and removed from the network without disruption. An example message broker is the IBM® WebSphere® Business Integration Message Broker product available from IBM. (IBM and WebSphere are registered trademarks of International Business Machines Corporation.)

Many publish/subscribe messaging systems are subject-based. In these systems, each message belongs to one of a predefined set of subjects (also known as channels, or topics). Publishers label each message with a subject, and consumers subscribe to all the messages having a particular subject label. For example, a subject-based publish/subscribe system for stock trading may use a defined topic name for each stock issue—publishers post information using the appropriate topic name and subscribers include topic names when specifying which stocks they wish to receive information about.

An alternative to subject-based publish/subscribe messaging is content-based publish/subscribe messaging as described in "An Efficient Multicast Protocol for Content-Based Publish-Subscribe Systems" by G Banava, T Chandra, B Mukherjee, J Nagarajarao, R Strom and D Sturman of IBM T.J. Watson Research Center (and other articles published by IBM Corporation via a Web site at URL www.research.ibm-.com/gryphon/). Compared with subject-based systems, content-based systems support greater flexibility for publishers and allow subscribers to express a "query" against the content of messages published. Thus, the limitation to predefined subjects that is a feature of subject-based systems can be avoided by more complex analysis of message content.

Some messaging systems provide a replay feature, for example retaining publications for replay to new subscribers (and newly recovered subscribers) so that the new subscribers are able to receive some or all of an earlier message feed. One such system is the CodeStreet ReplayService for Tibco Rendezvous/Java™ Messaging Service (www.codestreet.com). (Java and all Java-based trademarks and logos are trademarks of Sun Microsystems, Inc. in the United States, other countries, or both.)

In particular, some messaging systems enable subscribers to request a replay and to specify a sampling interval for the replay. For example, a subscriber may not require all previous messages and may specify a requirement to only receive every $N^{th}$ (e.g. $10^{th}$) message or to only receive a message once every M (e.g. 10) seconds.

Sampling is particularly useful in situations of data overload where the amount and frequency of data being transmitted (replayed) is such that it is near impossible to process the data quickly enough (either in terms of computation or human interpretation). One such example is a ticker tape of stock prices. By way of another example, the recipient may be interested in data variance of river height data or seismic activity (for instance, data that is above a certain value or where there are large changes in value).

A potential problem with such sampling of messages is that the sample may be unrepresentative of the sampled message feed, and this problem is emphasised if the number of messages transmitted in a sample period fluctuates and there are sparse periods. For example, if the sampling method periodically transmits the 'last received message' and there is a gap in the message feed spanning multiple sampling intervals, a single 'last received message' will be repeatedly sampled. There may be no way for a user to determine whether the repeats are valid results or whether an error has occurred (such as a connection failure or sampling inaccuracy).

This problem is best illustrated using FIG. 1. Arrow t shows the progression of time. A data feed 20 of messages is replayed. Each message 1-10 replayed as data feed 20 is shown above the arrow. A user however does not require all messages from the replay but only a pre-specified sample. For example, samples could be taken at 10 second intervals. FIG. 1 shows each sample a-j of the data feed depicted below the line.

Using a basic "last received message" algorithm, the sequence of messages returned as a result of such sampling would be 2, 3, 3, 3, 6, 6, 6, 7, 7, 9 and 10. It can be seen from this that some messages are sampled two or more times. This occurs when no new messages are received between sampling intervals. For example message 3 is the last message received when sample b is taken and because no new messages are received between sample b and sample c, message 3 is once again the last message received when sample c is taken.

Consequently, it should be appreciated that this sample completely distorts the actual picture, that is unless the receiving application is configured to recognise and deal with duplicate data. Indeed, depending on the messaging transport, it may not even be possible to distinguish between two different messages that happen to have the same data, and the same message delivered twice.

Distorted results are particularly a problem when a recipient application wishes to perform some analysis on the sample. If the sample is unrepresentative of the actual data feed, the results gathered by the recipient application may have very little meaning.

As discussed, sampling of fluctuating data feeds having sparse periods is particularly problematic, but it can also be difficult to obtain meaningful data from a populous data feed.

SUMMARY

According to a first aspect, the invention provides a method for sampling a data feed of messages at regular time intervals, the method comprising: identifying a current sample point; identifying a time interval defined by the current sample point and at least one of the previous sample point and the subsequent sample point; selecting at least one message to associate with the current sample point, the selection being made from the identified time interval; and associating at least one selected message with the current sample point.

A method according to this first aspect can be used to achieve a more representative sampling of messages than was achieved using known solutions.

A message may be selected from the time interval defined by the current sample point and the previous sample point. If however it is determined that the selected message has already been associated with another sample point, then a message is preferably selected from the time interval defined by the current sample point and the subsequent sample point.

In one embodiment, if it is determined that there is no message to return when looking behind the current sample point, a message is selected from the time interval defined by the current sample point and its subsequent sample point.

Preferably, in any case where a message selected from one identified time interval is not suitable (or none is returned), a new time interval is identified and a selection made from this newly identified interval. In other situations however, another message may be selected from the first identified interval.

In a conflict resolution embodiment, two sweeps are performed. Messages are selected and associated with sample points during a first sweep of the data feed. Conflicts between messages selected for adjacent sample points are identified and resolved during a second sweep of the data feed.

The first sweep preferably involves, for each sample point, identifying messages received during the time interval defined by the sample point previous to a current sample point and messages received during the time interval defined by the sample point subsequent to the current sample point. Preferably at least one identified message is then selected and associated with the current sample point.

Preferably the message selected is the one that was received most recently by comparison to the current sample point. Note, this message may be previous to the current sample point or subsequent thereto.

The second sweep preferably involves identifying two adjacent sample points each having the same message associated therewith. It is then determined whether an alternative message can be associated with either sample point.

If it is determined that neither sample point has an alternative message for association therewith, the conflicting message is preferably associated with the sample point occurring closest in time to the time at which the message was received.

If is determined that an alternative message can be associated with one of the two sample points, that alternative is preferably associated with the relevant sample point.

Preferably the message on which there was conflict is associated with the other sample point.

If both sample points have alternatives, then an alternative is preferably associated with one of the sample points. E.g. the sample point with the closest alternative.

In one embodiment the position of messages in the data feed is normalised. In this embodiment a message is preferably selected from the time interval defined by the current sample point and the subsequent sample point.

In one embodiment, a message is selected having a data value that is closest to the mean value of data messages in the time interval selected. In another embodiment, a message is selected having a data value that is closest to the mean value of data messages received as part of the data feed.

In one embodiment, it is determined whether a selected message has already been associated with a sample point and if the selected message has already been associated, an alternative selection is preferably made. Examples of how an alternative selection is made, are discussed with reference to the first embodiment and the conflict resolution embodiments below. For example, if a message has been previously used, a selection may be made from the time interval defined by the current sample point and the subsequent sample point. Alternatively a conflict may be identified and resolved via the processes of FIGS. 5 and 6.

According to a second aspect, the invention provides an apparatus for sampling a data feed of messages at regular time intervals, the apparatus comprising: means for identifying a current sample point; means for identifying a time interval defined by the current sample point and at least one of the previous sample point and the subsequent sample point; means for selecting at least one message to associate with the current sample point, the selection being made from the identified time interval; and means for associating at least one selected message with the current sample point.

Methods as described above may be implemented using computer program code that is executable by a data processing apparatus and the program code may be available for delivery over a network or recorded on a recording medium.

BRIEF DESCRIPTION OF DRAWINGS

Embodiments of the invention are described below in more detail, by way of example only, with reference to the accompanying drawings in which.

DETAILED DESCRIPTION OF EMBODIMENTS

As discussed above, obtaining a representative sample of a data feed replayed by a replay server can be difficult irrespective of whether the data feed has sparse periods or is populous. Both types of data feed will be dealt with herein.

Figure 2:
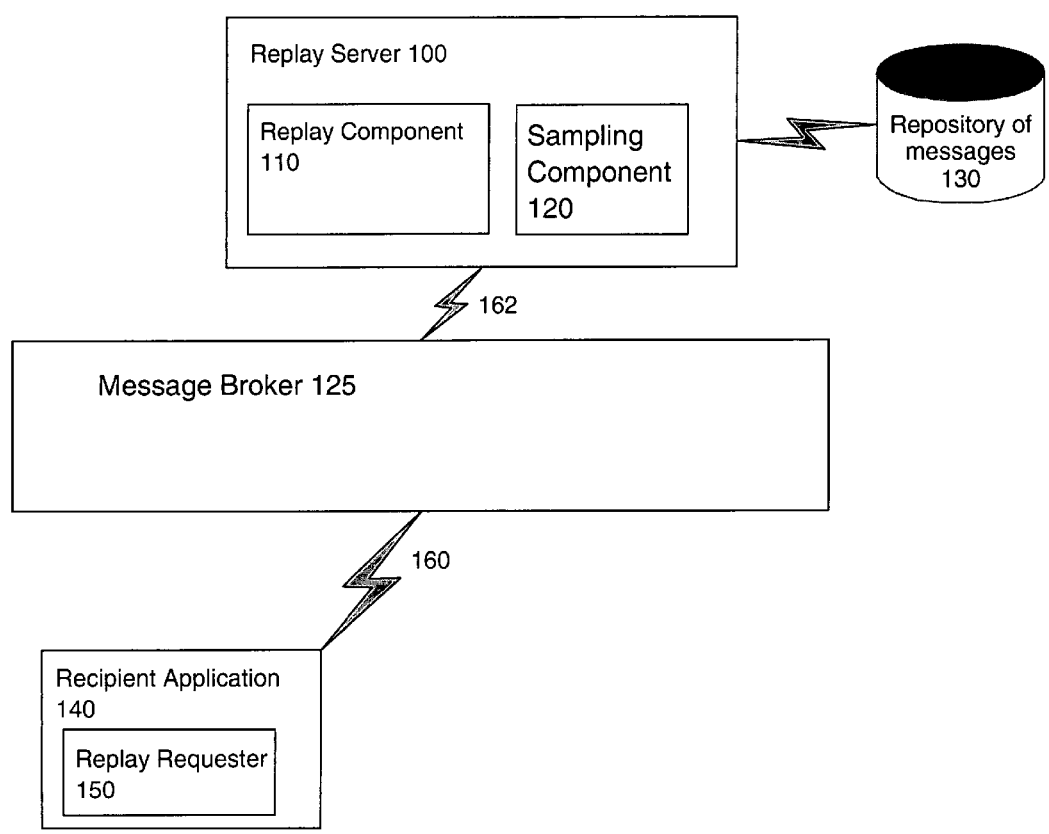
FIG. 2 provides an overview of the components involved in embodiments of the present invention.

FIG. 2 illustrates the environment in which the present invention is set in accordance with preferred embodiments. A replay server 100 participates in a messaging environment (for example a pub/sub environment) to store a copy of all messages received by a message broker (125) in message repository 130. Note the replay server may be integrated as part of the message broker or may be a separate component (as shown in the figure). In addition to message repository 130, replay server 100 includes a replay component 119 and a sampling component 120. Replay server 100 subscribes via network connection 162 to receive all messages transmitted to the message broker.

A recipient application 140 connects to message broker 125 via network connection 160. Recipient application comprises a replay requester 150 which is operable to make replay requests via message broker 125. Upon receipt of such a request, message broker 125 informs replay server 100 of the requester's requirements. For example, replay requester 150 could request a replay of all messages received with a specified time period (e.g. the last hour). Such replay is achieved at the replay server 100 via replay component 110.

Replay requester 150 may not however require all messages from the replay. Rather requester 150 may be interested in a sample of the complete replay. Thus requester 150 may specify this to server 100 which uses sampling component 120 to respond to recipient application 140's request. Note, replay requester 150 may request that sampling is provided as soon as possible (i.e. having no regard for the timing of the original message sequence). Another option is for replay requester 150 to request that sampling is provided having regard for the original message timing.

Replay messages are provided to the requester via the message broker.

Figure 3:
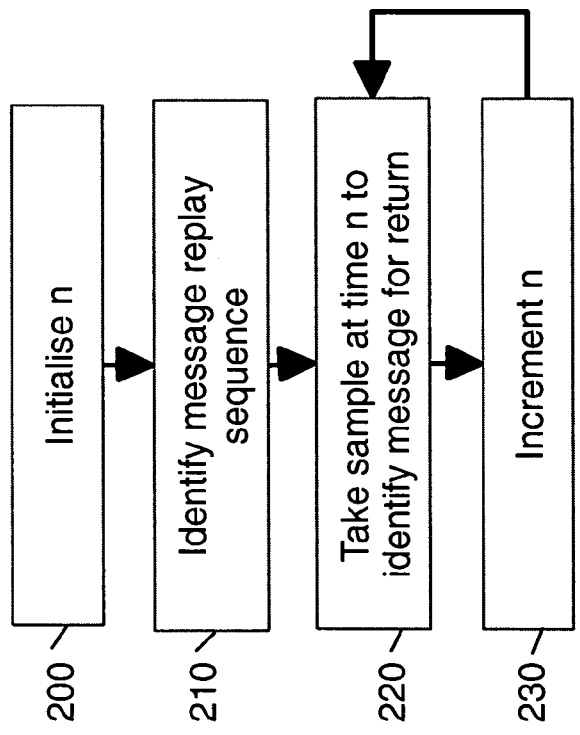
FIG. 3 provides an overview of the sampling process in accordance with embodiments of the present invention.

FIG. 3 provides an overview of the sampling process (at the replay server) in accordance with a preferred embodiment. A sample is taken every n seconds (specified by recipient application 140). Thus step 200 involves initialising n to the specified interval. For example, if application wants a sample every 5 seconds, then n is set to 5. At step 210 a message replay sequence is identified. Replay server 100 holds details of the order in which messages were received and the time at which they were received. Thus a set of messages must be identified, but there is no need to actually enact the replay.

A sample is taken at time n in order to identify a message to associate with the current sample point for return to the recipient (step 220). When this message is actually returned to the recipient application will of course be dependent upon the required replay speed (see above). At step 230 n is incremented by the specified interval and another sample is taken. The process repeats until the end of the replay sequence.

First Embodiment

Figure 4:
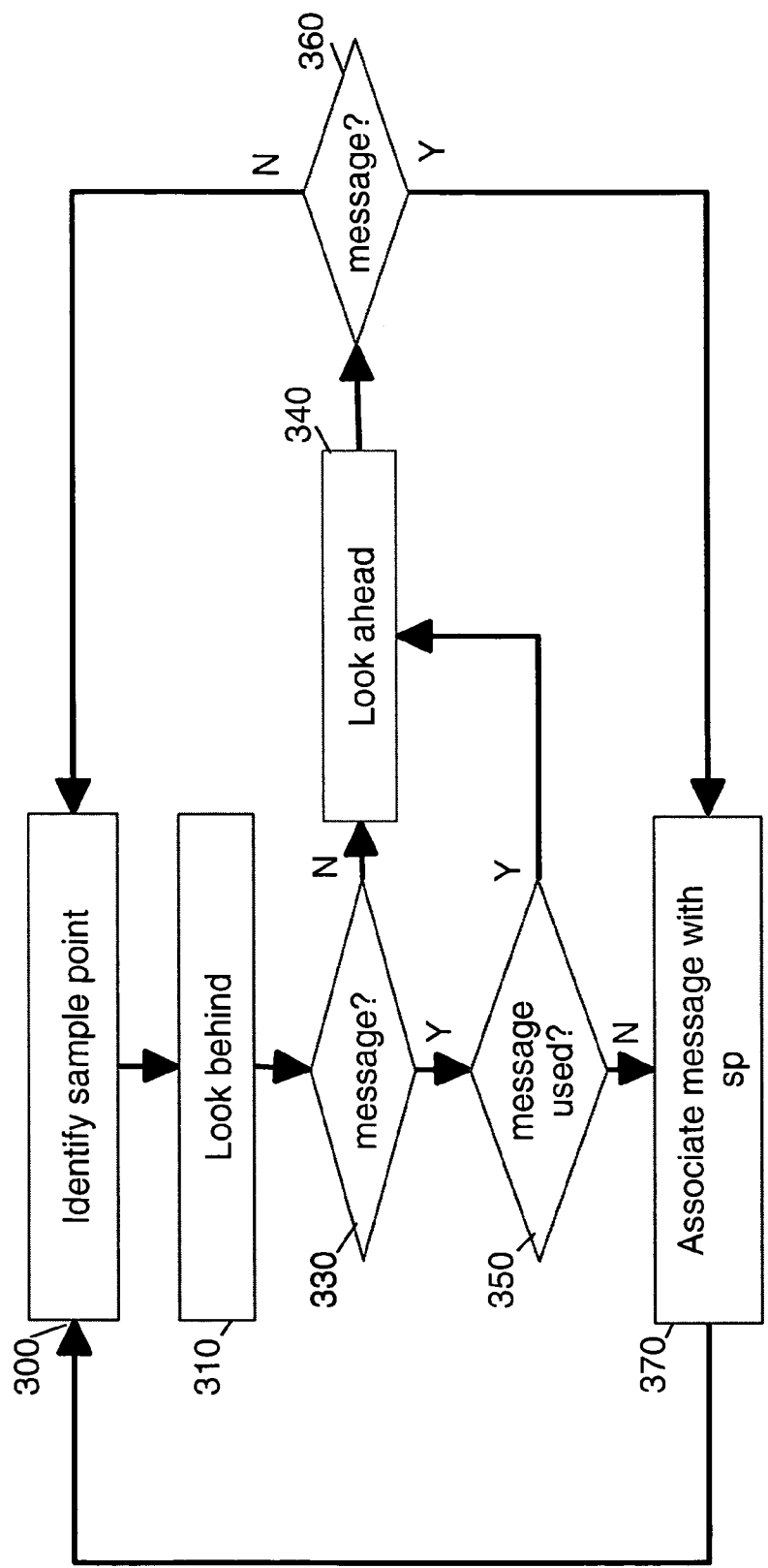
FIG. 4 shows the processing of a first embodiment.

FIG. 4 expands upon the processing of step 220 (FIG. 3) in accordance with one embodiment of the present invention. Sampling is performed to identify the last message received by the system relative to each sample point.

A sample point (sp) is identified at step 300. At step 310 a processing thread looks for messages received prior to the sample point (look-behind). It is determined whether any such messages exist (step 330). Note the scope of the look-behind is bounded by a previous sample point.

Assuming such messages exist in the previous interval, the last message received before the current sample point is identified and it is then determined whether the message has been previously associated with another sample point (step 350). If the answer is no, then the message is associated with the current sample point (step 370). If either there are no messages returned during the look-behind or the last message has already been used, then a look-ahead is performed to identify any messages appearing between the current time interval and the subsequent time interval (step 340). If no message is identified at step 360 then no message is associated with the current sample point and the whole process loops round until the end of the replay sequence is reached. If on the other hand a message(s) is identified then the message closest to the sp is associated with the current sp (step 370). The process then loops round again.

Note, whether a message has been previously used can be determined because each message is preferably uniquely identifiable.

Figure 1:
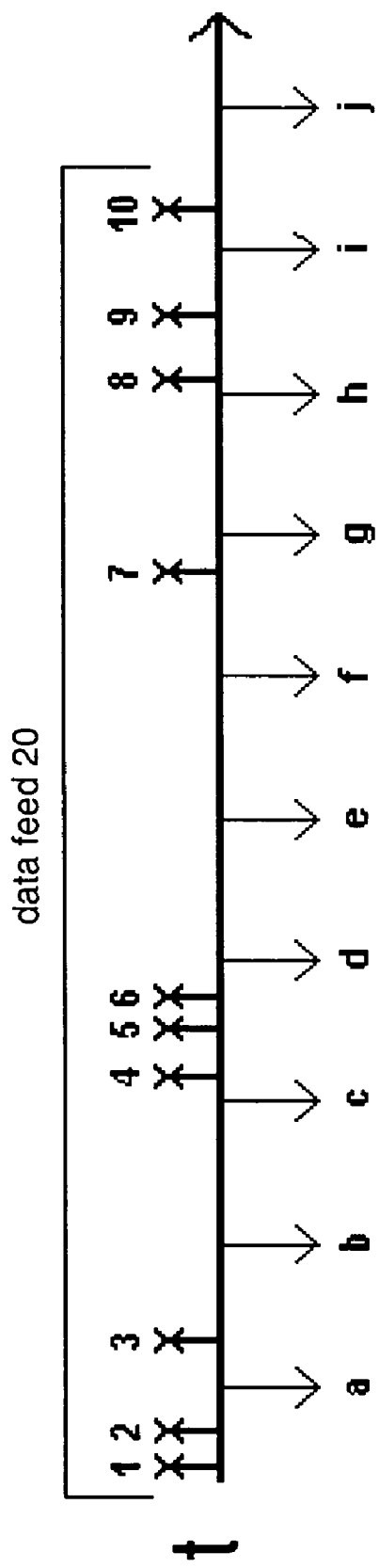
FIG. 1 shows an exemplary data feed and sample points.

The processing is best illustrated using the example of FIG. 1. Using look-behind and look-ahead for message selection over the time interval, the sequence of returned messages is 2, 3, 4, 6, <blank>, 7, <blank>, 8, 9, 10. This sequence is more representative of the data in the sparse feed, and is reached as follows. (Note look-behind and look-ahead only span over one time interval and the look-behind includes checking the sample point itself):

a. Look-behind (step 310) identifies message 2 at step 330 which has not been used (step 350) before and consequently 2 is selected (step 370).
b. Look-behind (step 310) identifies message 3 at step 330 which has not been used before (step 350). 3 is therefore selected (step 370).
c. Look-behind (step 310) returns nothing (step 330), look-ahead (step 340) identifies message 4 (step 360). 4 is therefore selected (step 370).
d. Look-behind (step 310) identifies message 6 as the last received message (step 330). This message is then associated with sample point d (step 370).
e. Look-behind returns nothing (step 330), look-ahead (step 340) also returns nothing (step 360). A message is therefore not associated with sample point e.
f. Look-behind returns nothing (step 330), look-ahead (step 340) returns message 7 (step 360, 370).
g. Look-behind returns nothing at step 330 since 7 is the only message in the time interval between f and g and 7 has already been associated with sample point f (i.e. 7 is used-step 350)), look-ahead also returns nothing (steps 340, 360).
h. Look-behind returns nothing (step 310, 330), look-ahead selects message 8 (step 340, 360, 370).
i. Look-behind selects message 9 (steps 310, 330, 350, 370).
j. Look-behind selects message 10 (steps 310, 330, 350, 370).

In this way a message is associated with each sample point as appropriate.

Conflict Resolution Embodiment

Figure 5:
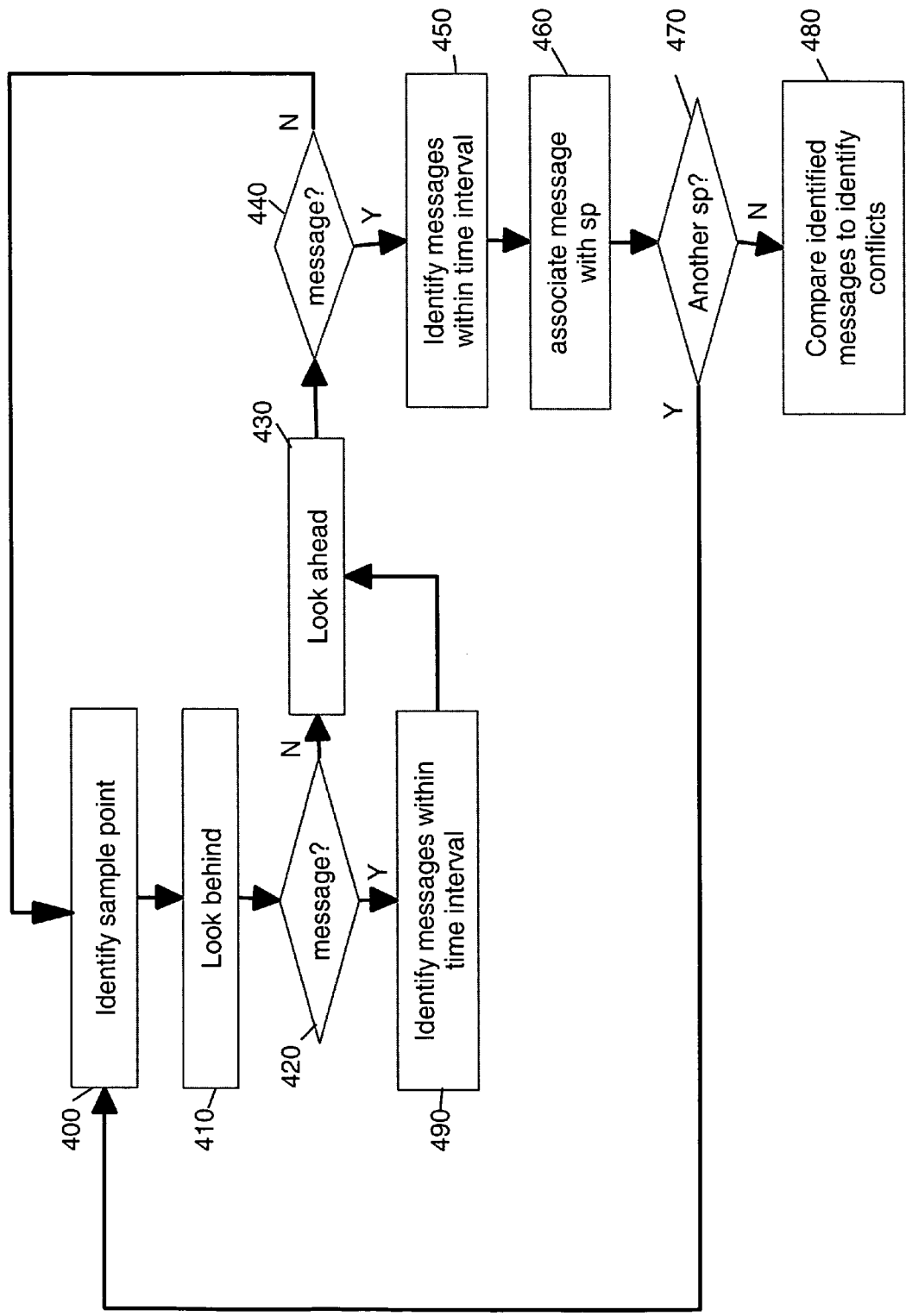
FIGS. 5 and 6 show the processing of a conflict resolution embodiment.
Figure 6:
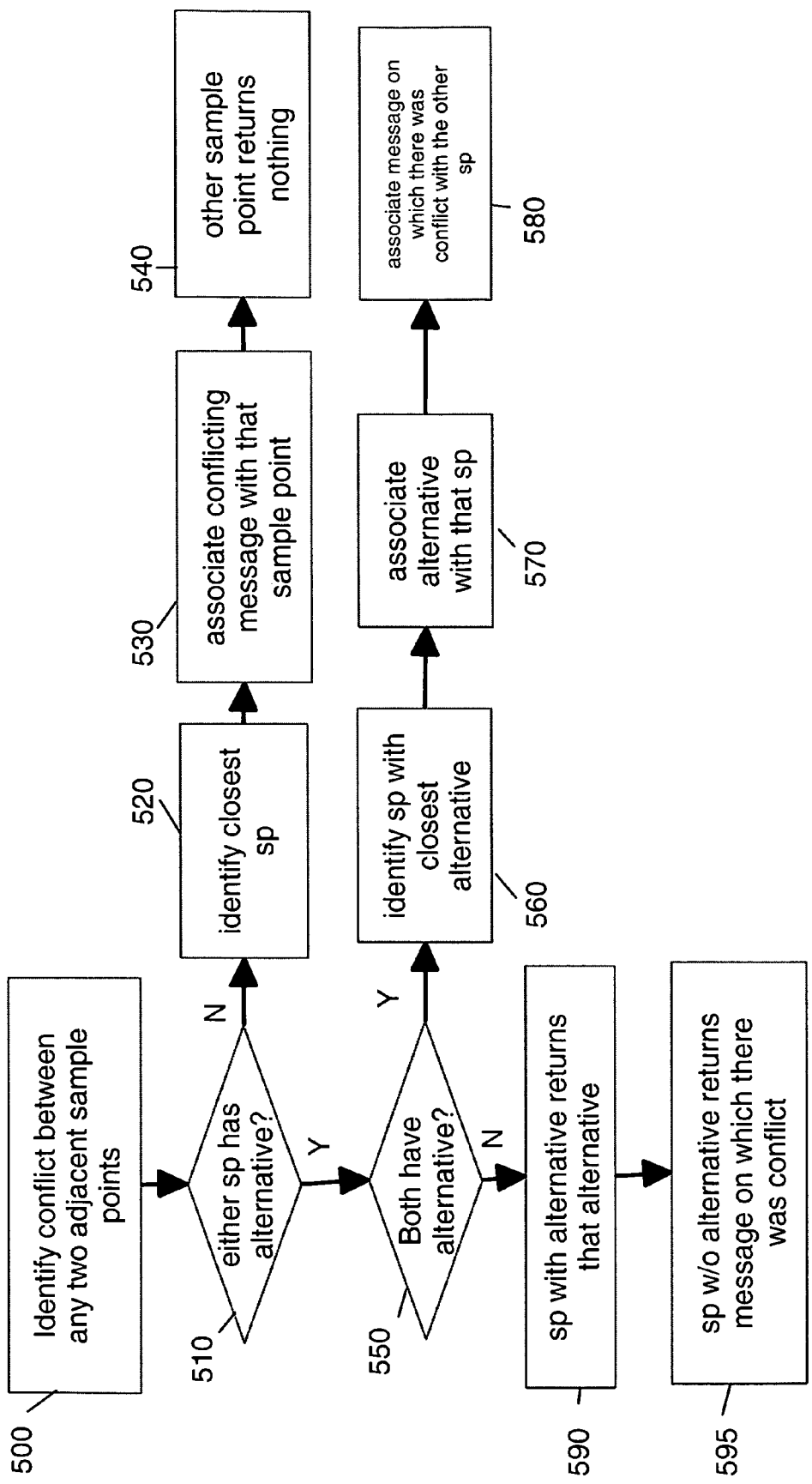

A second algorithm is shown with respect to FIGS. 5 and 6. This uses intelligent look-behind and look-ahead with conflict resolution. The sequence of returned messages from the FIG. 1 example is 2, 3, 4, 6, <blank>, <blank>, 7, 8, 9, 10. Again, this produces sampling representative of the entire replayed data feed and is reached in two sweeps (FIG. 5, FIG. 6) as follows:

FIG. 5 depicts the first sweep. At step 400 a sample point is identified. A look-behind is performed to identify any messages in the previous time interval (step 410, 420, 490). A look-ahead is then also performed to identify any messages within the subsequent time interval (steps 430, 440, 450). A message (either from the look-behind or from the look-ahead) is then associated with the current sample point (step 460). The message chosen is the one closest to the sample point. Note, if both a message from the look-behind and a message from the look-ahead are equidistance from the sample point, then the look-behind message is preferably chosen—this slightly reduces the risk of future conflicts. The process then loops round until all sample points have a message associated with them (steps 470, 400). Identified messages are then examined to determine any conflicts (step 480). For example, that two adjacent sample points have the same message associated with them. Step 480 is performed in a second sweep and is discussed in more detail with reference to FIG. 6.

Note, whether a message has been previously used can be determined because each message is preferably uniquely identifiable.

At step 500, a conflict is identified between two adjacent sample points. It is determined at step 510 whether either sample point has an alternative message that it can return instead. This means, for example, that whilst there may be a conflict on the last look-behind message, it may be able to use the last look-ahead message instead. If there is no alternative, then the sample point closest to the conflicting message is identified (step 520) and the conflicting message is associated with this sample point (step 530). The other sample point returns nothing (step 540).

If on the other hand, the result from step 510 is yes, then it is determined whether both sample points have alternatives.

Assuming for the moment that the answer is no, the sample point with the alternative returns that alternative (step 590) and the sample point without an alternative returns the message on which there was conflict (step 595).

If on the other hand both sample points have alternatives, then the sample point which has an alternative closest is identified and associated with that sample point (steps 560, 570). For the other sample point, the message on which there is conflict is associated. In an alternative embodiment, it is determined whether that sample point's alternative or the message on which there was conflict is closest to that sample point and the closest is selected.

Note, alternatives used during conflict resolution may be those messages selected by adjacent sample points without conflict initially. In order not to get into a cycle of continual resolution, in this case, once a message has been selected for a sample point in the initial sweep with no conflict, it cannot be used as an alternative in conflict resolution of an adjacent sample point.

The process repeats for all conflicts until all are resolved.

Note, intelligent processing is provided to always select the "best" alternative. Best is defined as "closest to the sample point" and must of course not have been already associated with a sample point. All messages within each interval are returned such that if the closest one is not available the next closest might be selected instead.

The processing is best explained with reference to the example of FIG. 1.

a. Look-behind returns messages 2 and 1 (steps 400, 410, 420, 490); look-ahead returns message 3 (steps 430, 440, 450). Messages 2 and 3 are nearest and equidistant so message 2 is selected (step 460).
b. Look-behind returns message 3 (steps 400, 410, 420, 490); look-ahead returns nothing (steps 430, 440, 450). Message 3 is selected (step 460).
c. Look-behind returns nothing (steps 400, 410, 420, 490); look-ahead returns messages 4, 5 and 6 (steps 430, 440, 450). Message 4 is nearest so this is selected (step 460).
d. Look-behind returns messages 6, 5 and 4 (steps 400, 410, 420, 490); look-ahead returns nothing (steps 430, 440, 450). Message 6 is nearest so this is selected (step 460).
e. Look-behind returns nothing (steps 400, 410, 420, 490); look-ahead also returns nothing (steps 430, 440, 450).
f. Look-behind returns nothing (steps 400, 410, 420, 490); look-ahead returns message 7 (steps 430, 440, 450), so message 7 is selected (step 460).
g. Look-behind returns message 7 (steps 400, 410, 420, 490); look-ahead returns nothing (steps 430, 440, 450), so message 7 is selected (step 460).
h. Look-behind returns nothing (steps 400, 410, 420, 490); look-ahead returns messages 8 and 9 (steps 430, 440, 450). Message 8 is nearest so this is selected (step 460).
i. Look-behind returns messages 9 and 8 (steps 400, 410, 420, 490); look-ahead returns message 10 (step 430, 440, 450). Message 10 is nearest so this is selected (step 460).
j. Look-behind returns message 10 (steps 400, 410, 420, 490); look-ahead returns nothing (steps 430, 440, 450), so message 10 is selected (step 460).

The first sweep is then complete, since there are no more sample points (step 480, no branch). Each sample point now has a message associated therewith. At step 480, conflicts are identified.

Step 480 is performed during a second sweep discussed in more detail with reference to FIG. 6.

Conflicts are first identified (step 500). With reference to FIG. 1, the first conflict identified is between sample points f and g. Both sample points have message 7 associated therewith. Neither f or g have an alternative (step 510), so the sample point to which message 7 is closest is identified (step 520). Consequently, message 7 is resolved to sample point g (step 530) and the other sample point f returns nothing (step 540).

The next conflict exists between i and j (step 500). Only one of these sample points has an alternative (step 510, step 550 no branch). i has the alternative of message 9 and so i is associated with message 9 (step 590). j has no alternative and so returns the message on which there was conflict (i.e. 10)—step 595.

To summarise:

(i)

At a time cycle interval, look-behind for a message to select within a defined time interval. By default this is the same as the sampling interval, but can be configured to be greater or smaller. If nothing is available, or the first message located has been previously used, use the same interval on a look-ahead. Select the first located message or return nothing if nothing is available in the time interval.

(ii)

At a time cycle interval, look-behind and look-ahead to check for any messages available in the range of the defined time interval (see above). Select the message nearest to the time interval. To resolve conflicts, if one interval has an alternative, use that. If both do, then the interval with the nearest alternative should use that.

Normalised Embodiment

Another solution is to normalise the data feed. This preferably involves dividing the time of the data feed into equal increments. The messages are then force-mapped onto these equal increments, and the sample is selected using simple look-ahead at each time interval.

Figure 7:
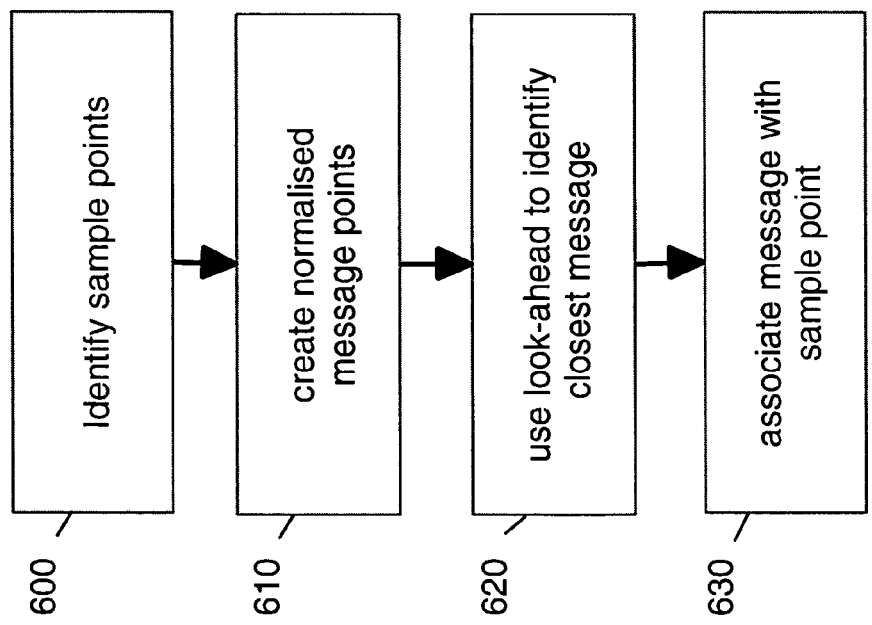
FIG. 7 shows the processing of a normalised embodiment of the present invention.

The processing will be discussed with reference to FIG. 7. Sample points are identified at step 600. For example a sampling interval of 10 seconds over a replay period of 60 seconds will result in 6 sample points (duration divided by sampling interval—60/10).

At step 610 normalised message points are created. In other words, each message (starting from time 0) is taken and moved to a predefined message point. For example if there is a replay duration of 60 seconds and there are 5 messages in the data feed, then there is a normalisation factor of 12 (60/5). Thus a message point occurs every 12 seconds—i.e. 12, 24, 36, 48, 60 (not at zero).

At step 620 a look-ahead is performed from each sample point to identify the message point (and thereby message) falling closest to the sample point. Such a message is then associated with the current sample point (step 630).

In this way messages are evenly spread across the full time interval. As indicated above, simple look-ahead is used to select the message to pass back to the user at each sample time segment. The benefit of the algorithm is that there is a defined and predictable time interval between messages. Also, it is known that if there are more messages than time segments then the messages delivered will be evenly spaced in the sample.

As discussed above, sampling can also be problematic for populous feeds not having sparse periods since it is important to be able to retrieve meaningful data.

Populous Data Feeds

The solutions suggested for populous data feeds preferably require the replay server to have means to process internal message data. The recipient application preferably supplies a comparison algorithm which the replay server then applies to identify messages to return to the recipient.

Mean Embodiments

The "Mean" solution selects one message from each time interval (segment) to pass back to the recipient application. The message selected has the closest value to the average value of all the messages in that interval, or all the messages in the entire replay sample.

The processing of the mean solution will now be described with reference to FIGS. 8a and 8b.

Figures 8A, 8B:
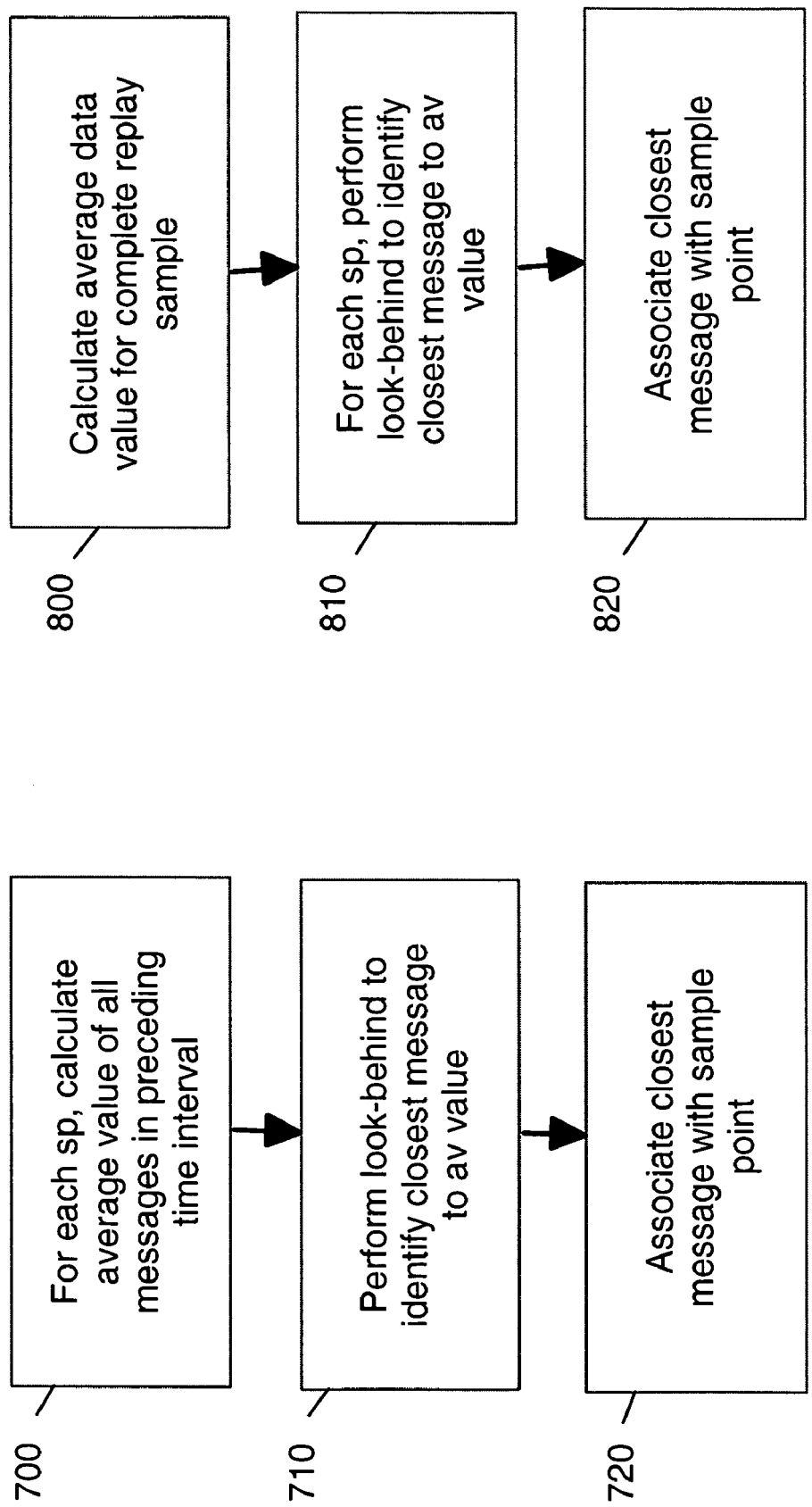
FIGS. 8a and 8b show the processing of a mean embodiment of the present invention.

FIG. 8a uses the mean value of the time interval preceding the current sample point. At step 700, and for each sample point, the average value of all messages in the preceding time interval is calculated. A look-behind is then performed to identify the message in the previous time interval, having the data value closest to the average value for that interval (step 710. The closest message is then associated with the current sample point (step 720).

FIG. 8b uses the mean value of all messages in the replay sample. At step 800, the mean value is calculated of all the messages in the replay sample. For each sample point, a look-behind is performed to identify the message having the data value closest to this average (step 810). The identified message is then associated with the current sample point (step 820).

Such solutions provide overview of the data in the replay sample. Consequently a large sample of data can be smoothed and trends will be easier to spot.

Delta Embodiment

"Delta", where only messages with data values greater than a given delta (plus or minus from a pre-defined data value) are used. The time segment interval is ignored in this case.

The "Delta" algorithm ignores the time interval for the sample and only passes back messages whose delta is greater than the supplied minimum. This algorithm requires two values: the absolute value of the delta and the reference value this is measured from (this second value could be the average of all the data in the sample). The algorithm will pass back messages whose data is greater than the reference value plus the delta, and those whose data is less than the reference value minus the delta. This is another good overview tool, except instead of smoothing out the abnormal events, it highlights them.

For both the mean and the delta embodiments, functionality is preferably provided at the replay server to interpret data in each message so that the mean or data value (as appropriate) can be calculated. For the mean embodiment, the recipient application preferably provides the replay server with a reference value and a change value.

Whilst the invention has been described in terms of replay, it should nevertheless be appreciated that replay is only necessary for algorithms employing look-ahead. For algorithms employing look-behind only, a non-replay system is possible. For example, the last interval's messages could be buffered and then a mean calculated using these buffered messages (although this buffering could be seen as a form of replay). The Delta algorithm could be applied to each message as it passes through—i.e. without buffering, since it is worked out on a per-message basis.

Put simply, whenever it is necessary to determine what to send out at a sample point based on all the messages in the previous interval, buffering or replay is used for at least that interval.

It should also be appreciated that "last message received" sampling is just an example of where the invention is useful. The invention is in no way limited to such. The key to the invention is that the sampling period is well defined.

The invention claimed is:

1. A method comprising:
   identifying a plurality of sample points within a data feed utilizing a predetermined sampling period; and
   generating a sampled data feed utilizing said data feed and said plurality of sample points, wherein said generating comprises
   for each sample point of said plurality of sample points,
       identifying messages of said data feed which were initially transmitted during a time interval from said predetermined sampling period prior to said each sample point to said predetermined sampling period after said each sample point,
       selecting a message of said messages which occurred closest in time to said each sample point, and
   associating said message of said messages with said each sample point.

2. The method of claim 1, wherein said generating further comprises:
   identifying a message association conflict between a first sample point of said plurality of sample points and a second sample point of said plurality of sample points, wherein said first sample point and said second sample point are adjacent to one another in time; and
   resolving said message association conflict.

3. The method of claim 2, wherein
   said identifying said message association conflict comprises determining that a conflicting message of said messages has been associated with said first sample point and said second sample point; and
   said resolving said message association conflict comprises
       responsive to a determination that neither of said first and second sample points can be associated with an alternative message, associating said conflicting message with a selected one of said first sample point and said second sample point occurring closest in time to a time at which conflicting message was received.

4. The method of claim 2, wherein
   said identifying said message association conflict comprises
       determining that a conflicting message of said messages has been associated with said first sample point and said second sample point; and
   said resolving said message association conflict comprises
       determining that a first one of said first sample point and said second sample point may be associated with an alternative message of said messages;
       responsive to a determination that a second one of said first sample point and said second sample point may not be associated with any alternative message, associating alternative message with said first one of said first sample point and said second sample point, and associating said conflicting message with said second one of said first sample point and said second sample point.

5. The method of claim 2, wherein said identifying said message association conflict comprises determining that a conflicting message of said messages has been associated with said first sample point and said second sample point; and said resolving said message association conflict comprises determining that said first sample point may be associated with at least a first alternative message of said messages;

determining that said second sample point may be associated with at least a second alternative message of said messages;

associating said second sample point with said conflicting message and said first sample point with an alternative message of said at least said first alternative message in response to a determination that said alternative message of said at least said first alternative message occurred closer in time to said first sample point than said at least said second alternative message of said messages occurred to said second sample point; and associating said first sample point with said conflicting message and said second sample point with an alternative message of said at least said second alternative message in response to a determination that said alternative message of said at least said second alternative message occurred closer in time to said second sample point than said at least said first alternative message of said messages occurred to said first sample point.

6. The method of claim , wherein:

said identifying said message association conflict comprises determining that a conflicting message of said messages has been associated with said first sample point and said second sample point; and said resolving said message association conflict comprises associating an alternative message of said messages with a selected one of said first sample point and said second sample point.

7. The method of claim 2, wherein said resolving said message association conflict comprises:

associating data indicating no message association with a selected one of said first sample point and said second sample point.

8. A computer program stored in a computer storage medium comprising program code means, which when executed by a computer, cause said computer to perform a method comprising:

identifying a plurality of sample points within a data feed utilizing a predetermined sampling period; and generating a sampled data feed utilizing said data feed and said plurality of sample points, wherein said generating comprises for each sample point of said plurality of sample points, identifying messages of said data feed which were initially transmitted during a time interval from said predetermined sampling period prior to said each sample point to said predetermined sampling period after said each sample point, selecting a message of said messages which occurred closest in time to said each sample point, and associating said message of said messages with said each sample point.

* * * * *

UNITED STATES PATENT AND TRADEMARK OFFICE
CERTIFICATE OF CORRECTION

| | | |
|---|---|---|
| PATENT NO. | : 7,580,760 B2 | Page 1 of 1 |
| APPLICATION NO. | : 11/377512 | |
| DATED | : August 25, 2009 | |
| INVENTOR(S) | : Allman et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 656 days.

Signed and Sealed this

Fourteenth Day of September, 2010

David J. Kappos
*Director of the United States Patent and Trademark Office*